Nov. 21, 1967 PER KAIN ETAL 3,353,384
ROLLING MILL
Filed Oct. 26, 1964
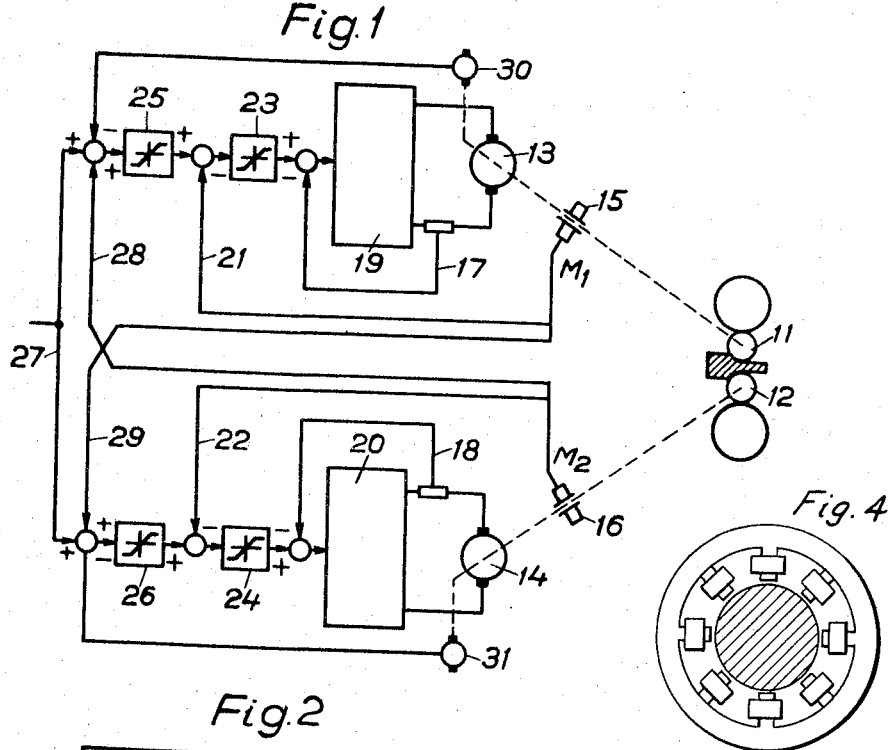
Fig. 1
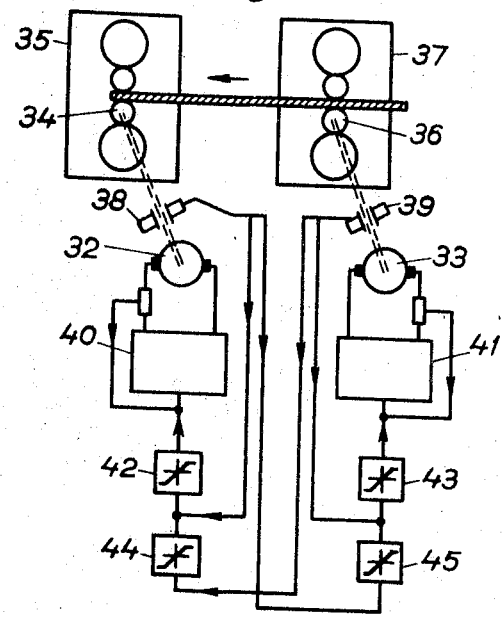
Fig. 2
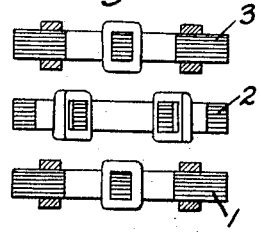
Fig. 5
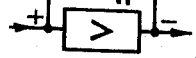
Fig. 3
Fig. 4
INVENTOR.
PER KAIN
VILMOS TÖRÖK
BY
Bailey, Stephens &
Huettig United States Patent Office 3,353,384
Patented Nov. 21, 1967

3,353,384
ROLLING MILL
Per Kain and Vilmos Török, Vasteras, Sweden, assignors to Allmanna Svenska Elektriska Aktiebolaget, Vasteras, Sweden, a corporation of Sweden
Filed Oct. 26, 1964, Ser. No. 406,529
Claims priority, application Sweden, Nov. 4, 1963, 12,084/63
5 Claims. (Cl. 72—19)

The present invention relates to a rolling mill with at least two electrical drive motors, each driving a roll system containing at least one working roll.

With such motors the motor moment has previously been measured by means of arrangements such as Hall generators, the input values of which or, as is known, armature current and magnetic flux. The measured value in this case includes, however, not only motor losses but also acceleration and retardation moment on the motor itself, because of which in a rolling mill of the above mentioned type signals from these generators are less suitable for control means, for example for load distribution between different motors and compounding of the motors.

The invention provides a rolling mill in control of which such inconveniences can be avoided and which is characterised in that there is arranged at the drive shaft system of the motor means for measuring torsional stresses, the output signals of this measuring means being fed to the control means for at least the other electrical motor.

With this arrangement the effective torsional moment from the motors is measured, and, by utilising the measured output signals from this indicator, a quick and exact control is produced, for example regulation of load distribution as compared to a desired value. It is possible to almost completely eliminate the influence of the inertia and the losses of the motor and by this means produce an exact regulation with low time constant. Preferably, the signals from each indicator should be fed also to the control means for the corresponding motor. The said signals can suitably be combined to form a resultant signal, corresponding to the actual load distribution between the motors, which resultant signal is fed to the control means of the motor in order to regulate the load distribution with reference to the desired value, as for example 1:1. The signals can also be combined to form a resultant signal, corresponding to the total roll moment, which resultant signal is fed to the control means of the appropriate motor in order to regulate the static compounding of the control system, that is the slope of the curve roll moment—number of revolutions. Both these resultant signals could in a suitable way be combined, in order to obtain a suitable characteristic for the control system. The possibilities for varying this combination for different power ratios are obvious.

For example during duplex drive of a pair of working rolls by means of the invention constant load distribution between the two drive motors can be maintained. In this way a solution of a problem is produced which cannot be solved by known constructions with a single drive for a pair of rolls, in which known construction power transmission to the one roll is accomplished by a more or less elastic connection. In each case there must be the same number of revolutions for both the working rolls. Non-uniform loading of the motors or difference in the number of revolutions can cause damage on the rolling mill and rolled goods. The invention is further exemplified in the accompanying drawings, in which FIG. 1 shows a duplex driven rolling mill and FIG. 2 two successive roll stands positioned in a continuous (or reversible) rolling mill. FIG. 3 shows a P-1 amplifier. FIG. 4 is an axial view of the torsion stress measuring means and FIG. 5 is a cross-section therethrough. FIG. 1 shows a rolling mill, among other things containing two working rolls, 11, 12. Working roll 11 is driven by a motor 13 and working roll 12 by a motor 14. At the motor shaft to the motors 13 and 14 (inside or outside the drive shaft bearing) means for measuring torsion stresses 15 and 16 are arranged, which measure outgoing motor moment $M_1$ or $M_2$. The means for measuring torsion stresses 15, 16 can be of different kinds, for example an arrangement for measuring torsion stresses in a shaft of magnetostrictive material. It consists (see FIGS. 4 and 5) of three substantially similar magnet cores 1, 2, 3, which are formed like stators with salient poles and are intended to enclose the motor shaft. The magnet cores are arranged axially one after the other (see FIG. 5) and the one in the middle is provided with magnetising windings on the poles, the magnetising windings being so connected to an A.C. supply that every other pole becomes a south pole and every other pole a north pole. The two outer cores 2, 3 have measuring windings on their poles and have these windings connected to one measuring device. The magnetising windings induce a magnetic flux, which traverses the shaft mainly on the surface. The cores with measuring windings are displaced so that with a free shaft the induced voltage is zero in the meter windings. If the shaft is loaded with a torsional moment, the magnetic flux is deformed and a voltage is induced in the measuring windings, which is proportional to the torsional moment transmitted through the shaft. A similar arrangement is described in the U.S. Patent 3,011,340.

Each motor 13, 14 is provided in the usual way with a current regulating circuit 17 or 18. The armature current being known, the measured signals are coupled to the control means of the motors 13, 14, here a controllable means 19, 20 for measuring a variable of the motor (armature and/or field current). Output signals from the means for torsion measurement, corresponding to the given moment $M_1$ or $M_2$ are fed to the control means of the corresponding motor. The said signal (over 21 or 22) is given the suitable magnitude $(k_f+k_n) \cdot M_1$ or $$(k_f+k_n) \cdot M_2$$

where $k_f$ is a coefficient corresponding to the degree of load distribution and $k_n$ the degree of static compounding. The explanation of this equation is given below.

Said signals are coupled to the input side of a proportional-integrating (PI)-amplifier 23, 24 with current limiting, that is, the amplifier has an output amplitude limited to a maximum value. The device 23, or 24 operates with limited current so as to compare its output signal with the current signal from 17 or 18. The intention of this is to prevent overloading of the motors. The signals from 21 or 22 are coupled so that negative feed-back is obtained from $M_1$. The output signal from the devices for measuring torsion stresses 15, 16 is also fed through 28 and 29 to the control means 19, 20 of the other motor ($M_1$ to 14, $M_2$ to 13) and regarding this part of the outsignal the magnitude $(k_f-k_n) \cdot M_2$ is given, where $k_f$ normally $>k_n$. The signals are fed so that positive feed-back is obtained from $M_2$ at $k_f>k_n$. They are fed on the input side to a proportional amplifier 25, 26 with maximum output amplitude and amplification 1:1 ($k=1$). The output side of this amplifier is connected to the input side of PI-amplifier 23, or 24. The resultant signal becomes therefore at the input side to 23:

$$+(k_f-k_n) \cdot M_2 - (k_f+k_n) \cdot M_1 = -k_f(M_1-M_2) - k_n(M_1+M_2)$$

where one can see that the term $-k_f(M_1-M_2)$ refers to the load distribution and $-k_n(M_1+M_2)$ the slope of the curve roll moment-number of revolutions, the so-called statics.

The corresponding resultant signal at control means 20 becomes $$+(k_f-k_n)\cdot M_1-(k_f+k_n)\cdot M_2$$
$$=-k_f(M_2-M_1)-k_n(M_2+M_1)$$

By varying the terms $k_f$ and $k_n$, that is to say the degree of feed-back, the system can be controlled more or less on the load distribution or statics. The moment limit from amplifier 25 or 26 is $(k_f+k_n)\cdot M_{1max}$. or $$(k_f+k_n)\cdot M_{2max}.$$

where $M_{1max}$. and $M_{2max}$. are maximum allowed moment upon the devices for measuring torsion stresses 15 respectively 16. As the output signal from the amplifier 25 respectively 26 is compared with a moment signal at the input side to PI-amplifier 23 or 24, the amplifiers 25 and 26 can act to limit the moment. Thus a too great a signal from the device for measuring torsion stresses of the other motor or elsewhere, for example from a device for speed control, will not cause mechanical overloading of the means on the motor shaft.

The number of revolutions of the motors 13, 14 are sensed by means of tachometer generators 30, 31, and their output signals are fed together with a speed reference signal (from 27) to the input side of the amplifiers 25 or 26.

The number of motors is in this case two, but it is of course also feasible to use several mill stands within one rolling mill, each with duplex drive. Between the different mill stands the load distribution and certain control statics (ratio of roll moment to number of revolutions curve) can also be maintained.

Control between two motors belonging to different mill stands in a continuous or reversible roll chain is shown in FIG. 2. Motor 32 operates the lower working roll 34 in mill stand 35 (or both the working rolls in it) and motor 33 operates the lower working roll 36 in mill stand 37 (or both the mill stands). The devices for measuring torsion stresses 38 and 39 are, in the same way as the embodiment shown above, connected to the first and second control means of the motors 40 or 41 above its own PI-amplifier 42 or 43 by current limiting. The signal from the device for measuring torsion stresses of the other motor is coupled to the input side of a proportional amplifier 44 or 45 with moment limiting. In this case it is suitable at least substantially to control a certain ratio between roll moment and number of revolutions. Said device can suitably be combined with a device according to FIG. 1. PI-amplifiers are suitably an ordinary amplifier inversely fed back through a resistance in series with a capacitance.

The invention can be varied in many ways within the scope of the following claims.

We claim:

1. Rolling mill with working rolls and a first and a second electrical drive motor, each motor driving a different working roll, a shaft system comprising a shaft of magneto-strictive material connecting each motor to its respective working roll, first and second means operatively connected one with each said shaft for measuring the torsional stresses in said shaft for each of said rolls, each of said first and second measuring means having an output, means oppositely connecting the outputs; of said first and second measuring means to each other to obtain a resultant signal corresponding to the actual load distribution between said motors, control devices for each of said motors, and means to feed said resultant signal to the control devices of said motors in order to regulate said load distribution at a desired value.

2. Rolling mill according to claim 1, said means connecting the outputs of said first and second measuring means including means to produce a resultant sum of said two signals in order to obtain a signal corresponding to total roll moment and means to feed said sum signal to the control means of the motors in order to obtain a desired value of the ratio between the rolling moment and the number of revolutions.

3. Rolling mill according to claim 2, third and fourth measuring means one for measuring the armature current in each of the motors, first and second proportional-integrating amplifier means, means coupling the outputs of each of said first and second measuring means to the input sides of both said amplifier means, means coupling the output sides of said third and fourth measuring means to the output sides of said first and second amplifier means respectively, and means to combine the signals and feed the combined signals from each amplifier means to the control device of one of said motors.

4. Rolling mill having two cooperating rolls in a set and a first and a second electric drive motor, each motor driving one of said set of rolls, a shaft system comprising a shaft of magneto-strictive material connecting each motor to its respective working roll, first and second means operatively connected one with each said shaft for measuring the torsional stresses in said shaft for each of said motors, each of said measuring means having an output, means oppositely coupling the outputs of said first and second measuring means to each other to obtain a resultant signal corresponding to actual load distribution between said motors, control devices for each of said motors, and means to feed said resultant signal to the control devices of said motors in order to regulate said load distribution at a desired value.

5. Rolling mill according to claim 4, in which said means for measuring the torsional stresses comprises magnetic cores having at least two salient poles each and being arranged side by side in the axial direction of said shaft and spaced from it, and aligned normal to the axis of said shaft with said poles facing a surface of said shaft, the poles of one of said cores being displaced in relation to the poles of the other core substantially half a pole pitch in the peripheral direction of said shaft, an excitation winding on one of said cores and a measuring winding on the other core, an alternating current source connected to said excitation winding and the output the side of said measuring winding being constituted by a connection to said measuring winding.

References Cited

UNITED STATES PATENTS

| | | | |
|---|---|---|---|
| 3,134,279 | 5/1964 | Sims et al. | 72—19 |
| 3,200,624 | 8/1965 | Tix | 72—19 |

FRANCIS S. HUSAR, *Primary Examiner.*